United States Patent
Gottlieb

(10) Patent No.: US 11,727,237 B2
(45) Date of Patent: *Aug. 15, 2023

(54) COMMUNICATION PLATFORM

(71) Applicant: Adam Gottlieb, Sydney Markets (AU)

(72) Inventor: Adam Gottlieb, Sydney Markets (AU)

(73) Assignee: Adam Gottlieb, Sydney Markets (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/985,054

(22) Filed: Nov. 10, 2022

(65) Prior Publication Data

US 2023/0115977 A1   Apr. 13, 2023

Related U.S. Application Data

(63) Continuation of application No. 17/427,588, filed as application No. PCT/AU2020/050089 on Feb. 5, 2020, now Pat. No. 11,574,159.

(30) Foreign Application Priority Data

Feb. 5, 2019 (AU) .................................. 2019900351

(51) Int. Cl.
| | | |
|---|---|---|
| *G06K 19/06* | (2006.01) | |
| *G06F 16/38* | (2019.01) | |
| *G06F 16/955* | (2019.01) | |
| *G06K 7/10* | (2006.01) | |
| *G06K 19/07* | (2006.01) | |

(52) U.S. Cl.
CPC ..... *G06K 19/06037* (2013.01); *G06F 16/381* (2019.01); *G06F 16/9558* (2019.01); *G06K 7/10009* (2013.01); *G06K 7/10544* (2013.01); *G06K 19/0723* (2013.01)

(58) Field of Classification Search
CPC ............ G06K 19/06037; G06F 16/381; G06F 16/9558
USPC ......................................................... 235/494
See application file for complete search history.

(56) References Cited

U.S. PATENT DOCUMENTS

| | | |
|---|---|---|
| 9,047,631 B2 | 6/2015 | Sridharan et al. |
| 9,374,459 B1 | 6/2016 | Koster |
| 2006/0065733 A1 | 3/2006 | Lee et al. |
| 2012/0226779 A1 | 9/2012 | Crucs |

(Continued)

OTHER PUBLICATIONS

International Search Report and Written Opinion of the International Searching Authority, dated Mar. 31, 2020, Corresponding to PCT/AU2020/050089, 14 pages.

*Primary Examiner* — Allyson N Trail
(74) *Attorney, Agent, or Firm* — Lewis Roca Rothgerber Christie LLP

(57) ABSTRACT

This disclosure relates to a communication system where a user can use a smart phone to scan a tag, such as a QR code, to retrieve a weblink. The weblink is unique and associated with the location of the tag, which may also be the location of an unpersonalised device, such as a video projector or other A/V equipment. Therefore, when the mobile phone connects to the weblink, the webserver can retrieve information associated with this particular unique code. This information is now specific to the location of the tag and may even include information about the unpersonalised device. The operator receives the information when the communication channel is established and therefore knows exactly what the subject of the call will be. Further, the call can be automatically routed to the most appropriate operator without audio menus to be navigated by the user.

18 Claims, 14 Drawing Sheets

(56) References Cited

U.S. PATENT DOCUMENTS

| | | |
|---|---|---|
| 2013/0144691 A1 | 6/2013 | Mehta et al. |
| 2014/0229251 A1 | 8/2014 | Lim et al. |
| 2022/0027992 A1 | 1/2022 | Blevins |
| 2022/0083620 A1 | 3/2022 | Fairband et al. |
| 2022/0108340 A1 | 4/2022 | Doumar et al. |

Fig. 15

COMMUNICATION PLATFORM

CROSS-REFERENCE TO RELATED APPLICATIONS

This is a continuation application of U.S. patent application Ser. No. 17/427,588, filed Jul. 30, 2021, which is a 371 National Stage Application of PCT/AU2020/050089, filed Feb. 5, 2020, which claims priority to and benefit of Australian Provisional Patent Application No 2019900351, filed on 5 Feb. 2019, the contents of which are incorporated herein by reference in their entirety.

TECHNICAL FIELD

This disclosure relates to a communication platform and method to establish a communication channel. For example, but not limited to, this disclosure relates to establishing a communication channel between a user of a device to a support operator providing support for that device.

BACKGROUND

Telephone systems have been used for many years and IP telephony including video calls over IP are becoming more and more popular. At the same time, devices that are used often are becoming more and more complex leading to an increased need for support. However, the support operators are often poorly informed about the device at issue and therefore, the communication is not efficient. This is especially the case for unpersonalised devices, which are in contrast to personalised devices such as laptops, mobile phones tablets etc. While users are often familiar with their personalised devices and willing to invest time into solving any issues once, this is different for unpersonalised devices that are just used once and solutions need to be found quickly. For example, most boardrooms have audio/video (AV) equipment that often cannot be used due to configuration issues that are beyond the technical capabilities of the presenter. In those cases, the presenter may call a service hotline where a support operator picks up the call. However, the operator can only see the caller's phone number and has no information about the location of the caller or the type of device that is misbehaving. Further, it is difficult to connect the calls to the service hotline number with the most suitable operator because no information about the problem is available.

One solution to this problem are automated audio menus where a computer-generated voice asks a series of questions about the call before connecting the call to an operator, such as "If you have problems with a device, dial 1". This solution, however, is frustrating for the user, who is already distressed, and cannot provide highly specific information to the operator before connecting the call.

It is also possible to encode contact information, such as complete VCF cards, into tags, such as QR codes. However, this does not solve the problem as the user uses these tags only to determine the number to call but the result is identical to the caller typing the number manually.

Therefore, there is a need for a more efficient communication system.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

There is provided a communication system where a user can use a smart phone to scan a tag, such as a QR code, to retrieve a weblink. The weblink is unique and associated with the location of the tag, which may also be the location of an unpersonalised device, such as a video projector or other A/V equipment. Therefore, when the mobile phone connects to the weblink, the webserver can retrieve information associated with this particular unique code. This information is now specific to the location of the tag and may even include information about the unpersonalised device. The operator receives the information when the communication channel is established and therefore knows exactly what the subject of the call will be. Further, the call can be automatically routed to the most appropriate operator without audio menus to be navigated by the user.

The uniqueness of the code attached to the device allows the administrator to determine which communication methods will be available, and which information is accessed, which can be uploaded on-demand through a simple user interface thereby creating a mini-information portal. Blending information, location and communication.

In this sense, this disclosure provides a communication hub where information is provided to the operator when a communication channel is established. This is an advantage over existing systems where, at most, the callerID is provided to the operator. At the same time, since the weblinks are unique, the information provided to the operator can be re-configured dynamically by an administrator.

Further, information can be provided to the user scanning the code, which means highly location specific, or device specific information is available due to the unique nature of the code. In other words, there is provided an information hub with access by users to specific pieces of information stored on the information hub without having to specify which information is desired but instead, accessing the information by scanning a unique code on a tag that links to that information. Telephone and communications systems to date have been about physical voice/video/text—however the disclosed technology adds 'information' into that process flow to allow unique and updatable information to be accessed via the same channel—on-demand for both the operator and the receiver.

It is important to note that with the disclosed solution, hundreds or thousands of unique QR codes can be generated relatively easily and quickly and those large number of codes can be administered and configured easily so that each code is specific to a particular location, device or other deployment point.

There is provided a communication system comprising:
multiple unique read-only tags providing respective codes and to be deployed in association with respective locations;
a deployment computer system to generate the respective codes for the multiple unique read-only tags at deployment of the multiple unique read-only tags, each code encoding a unique weblink;

a configuration computer system to receive user input from an administrator to associate each of the multiple read-only tags with information regarding the location of that read-only tag and with information regarding a communication end-point for communication in relation to the location;

a communication server configured to:
receive a web-request for one of the unique weblinks from a personalised device that reads the read-only tag with the one of the unique weblinks encoded thereon;
retrieve the information regarding the location associated with the one of the unique weblinks;
provide the retrieved information to an operator at the communication end-point associated with the one of the unique weblinks; and
establish a communication channel between the personalised device and an operator.

It is an advantage that the code provided by the read-only tag encodes a unique weblink that, in turn, is associated with information regarding the location of the tag stored on a computer system. This way, the information is specific to that tag but can nevertheless be updated easily and quickly. This provides more specific and more efficient access to data stored in a computer system without a need for the user to specify the data.

The read-only tags may comprise one or more of printed QR codes, displayed QR codes and NFC devices.

The respective locations associated with the multiple read-only tags may be locations of respective unpersonalised devices and the information associated with the location may comprise information about the unpersonalised devices to facilitate the operator to provide support for the respective unpersonalised devices.

The communication server may be further configured to serve a website to the personalised device, the website comprising options for establishing the communication channel.

The website may comprise multiple scrollable pages. The website may be based on a static template with dynamic elements that are filled with content specific to the corresponding read-only tag. The options may be based on the information associated with the location received from the administrator. The options may comprise multiple departments as end-points for the communication.

The communication channel may comprise an audio call or video call.

The weblink may comprise a uniform resource locator (URL) comprising a hostname and a filename, wherein the filename is unique and generated by the deployment computer system to generate the code.

The configuration computer system may be configured to generate a graphical user interface for the administrator to input the information.

The graphical user interface may comprise a list of candidate end-points from which the administrator can choose the end-point.

A method for establishing a communication channel comprises:
generating respective codes for multiple unique read-only tags at deployment of the multiple unique read-only tags, each code encoding a unique weblink;
receiving user input from an administrator to associate each of the multiple read-only tags with information regarding the location of that read-only tag and with information regarding a communication end-point for communication in relation to the location;
receiving a web-request for one of the unique weblinks from a personalised device that reads the read-only tag with the one of the unique weblinks encoded thereon;
retrieving the information regarding the location associated with the one of the unique weblinks;
providing the retrieved information to an operator at the communication end-point associated with the one of the unique weblinks; and
establishing a communication channel between the personalised device and an operator.

A method for information management comprises:
storing sets of data in a data repository;
associating each of the sets of data with a unique weblink;
encoding the unique weblink in a tag to be deployed at a deployment point; and
upon receiving a web request for the weblink, providing the set of data associated the requested weblink, wherein the central data repository is configured for repeated updating of the sets of data between requests for the weblink and while maintaining the association with the weblink.

Providing the set of data may comprise sending the set of data in a response to the request for the weblink.

Optional features described of any aspect of method, computer readable medium or computer system, where appropriate, similarly apply to the other aspects also described here.

BRIEF DESCRIPTION OF DRAWINGS

An example will now be described with reference to the following figures:

FIG. 15 illustrates the user interface of FIG. 14 but now the consultation is disabled.

DESCRIPTION OF EMBODIMENTS

Figure 1:
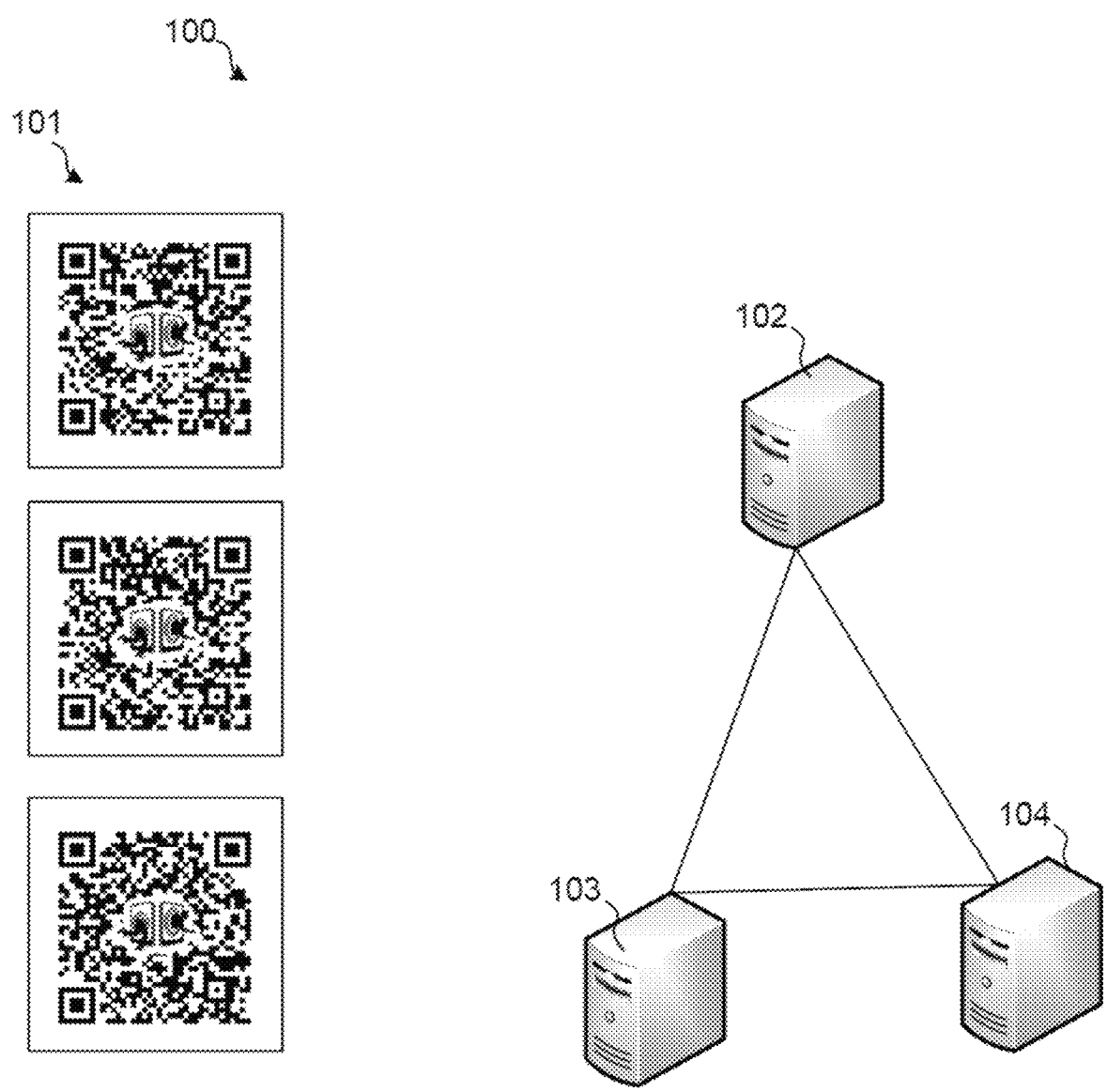
FIG. 1 illustrates a communication system.

FIG. 1 illustrates a communication system 100, comprising multiple unique read-only tags 101, a deployment computer system 102, a configuration computer system 103 and a communication server 104. While items 102, 103 and 104 are shown as separate entities, it is to be understood that they may be implemented together on a single hardware platform or distributed more granularly for load balancing purposes or geographic spread, for example.

The multiple read-only tags 101 provide respective codes, such as a QR code, a code in an NFC tag or any other code in other types of tags. A 'code' herein refers to any digitally stored data that represents information, such as a number of black and white squares printed on a white background as a QR code encoding a weblink, or the weblink stored on an NFC chip in clear text or encrypted or encoded otherwise. The read-only tags 101 are to be deployed in association with respective locations. For example, they may be produced as stickers and affixed on the surface of an object. In other examples, the QR codes are displayed on a computer screen, such as a multi-media billboard.

In yet a further example, the read-only tags are attached to electronic or other equipment with the aim of providing further help or information to this equipment when requested by a user of the equipment. While examples herein relate to tags encoding the unique weblinks, it is noted that the unique weblinks may also be sent to users via text messages, such as SMS, WhatsApp or other services.

Read-only in this context means that the tags are created once and then remain in their configuration during their deployment. For example, the QR codes are naturally read-only when they are printed. However, even when the QR codes are displayed on a computer screen, it is envisaged that they are not modified 'on the fly' but read only. If the code is to be changed, a new code would be deployed altogether. This also applies to NFC tags that are 'programmed' once with the encoded weblink and deployed without being reconfigured in the field.

More particularly, deployment computer system 102 generates the respective codes for the multiple unique read-only tags at deployment of the multiple unique read-only tags. For example, deployment computer system may automatically generate a unique weblink and generate the code so that the code encodes the unique weblink. Unique in this context means that the same weblink only exists once in the communication system 100 and no two identical weblinks exist. This means that each weblink is for exactly for one tag. In another example, a user creates the weblink manually, so that it represents the location where the tag is to be deployed. Weblinks typically comprise a protocol name, such as "https", a host name, such as www.examplehost.com and a file name, such as "index.html". For the unique weblinks described herein, the file name represents the unique part of the weblink. For example, the file name may represent a location, such as "24MainSt_Room4". It is noted that the file name extension ".html" is not necessary. The advantage here is that the weblink www.examplehost.com/24MainSt_Room4 can be used by human users elsewhere, such as easily typed into browsers manually etc. without the need for cryptic extensions and parameter name/value pairs that are used with other weblinks. It is further noted that if the weblink is unique, the code encoding the weblink is also unique because typically a bijective function is used to map between the two.

Configuration computer system 103 receives user input from an administrator to associate each of the multiple read-only tags with information regarding the location of that read-only tag. In this context, information regarding the location of the tag means any information that is relevant at that location and may include information about a device or other piece of equipment that is installed or located at that location. In other examples, the information is purely about the location, such as a tourist attraction or hospitality venue (restaurant, café, etc.).

The information regarding the location may include a variety of different types of information. For example, the information may be human readable information intended to be forwarded to an operator at a later step. In other examples, the information is intended to be provided to the user who operates the personalised device to read the tag. For example, the information may be in the form of documents, such as user manuals or operating documents that are accessible through the tag in the form of pdf documents or websites. In one example, the read-only tags are deployed throughout a mine site and at each location, such as each floor or each shaft of the mine, scanning the tag provides access to documents related to this particular location within the mine site, such as operational information regarding machines or personnel at this location.

As will be described further below in more detail, the information can be accessed by scanning the read-only tag using a camera of a personalised device, such as a mobile phone. Since the scanned QR code is unique in the sense that it points to a unique weblink, the information that is accessed by the weblink is unique to this particular location or deployment point.

Figure 2:
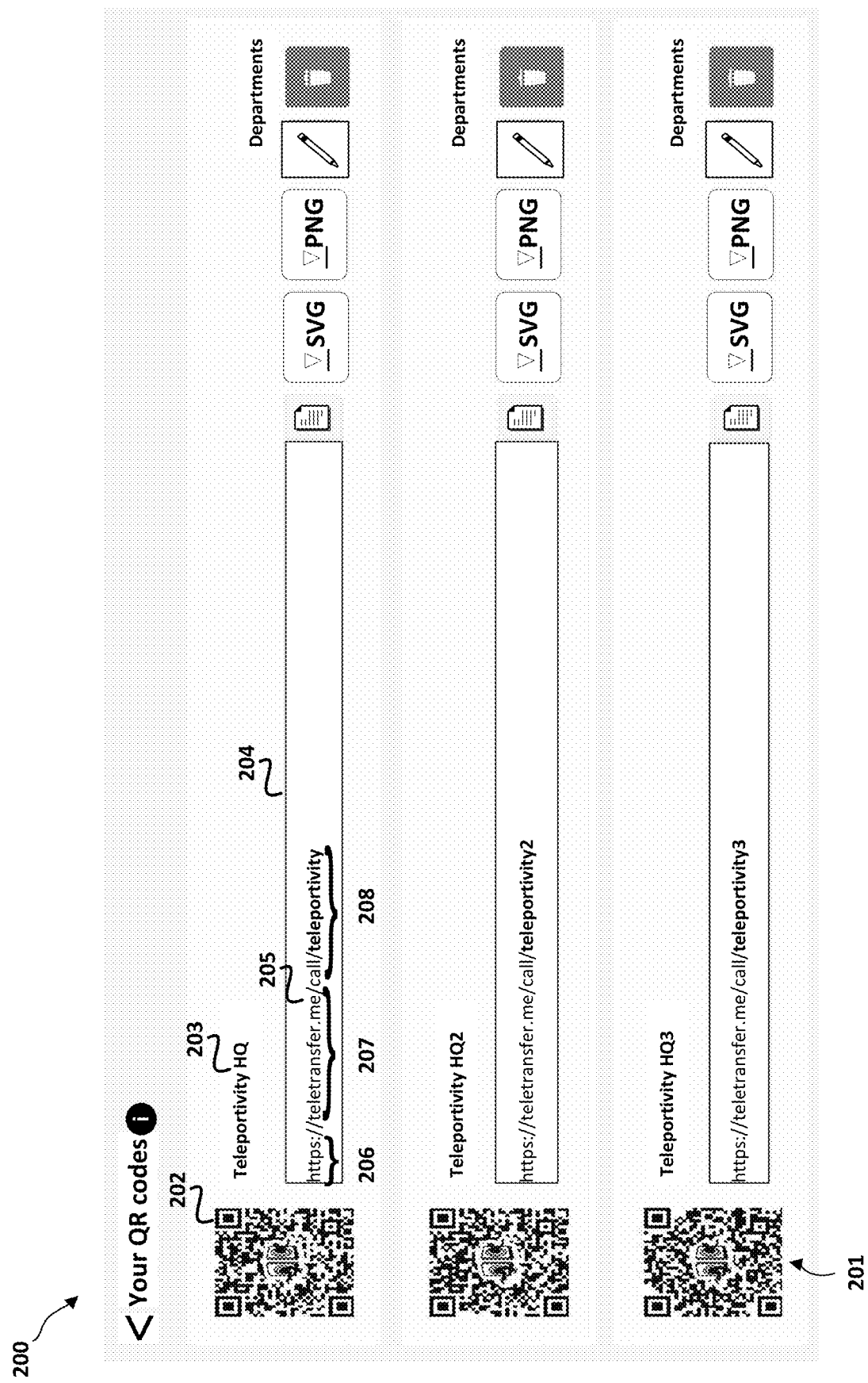
FIG. 2 illustrates a user interface for configuring weblinks.

FIG. 2 illustrates a user interface 200 generated by the configuration computer system 103 to configure the association and coding between weblinks and tags. In particular, user interface 200 shows multiple QR tags 201 with an example OR tag 202 chosen for the following explanation, which applies to all QR tags 201, respectively. QR code may first be randomly initialised or initialised with predefined encoded information, such as a random number or a random, unique filename behind a pre-configured hostname.

User interface 200 further shows a title 203 for QR tag 202, which can be chosen by the administrator. Importantly, there is an input field 204 for the unique weblink 205. As shown, weblink 205 comprises a protocol name 206, a hostname 207 and a file name 208, which is hierarchical in this case as indicated by the '/' separators. Other separators or preconfigured symbols may be used since these are mainly for the human operators to create a hierarchical structure within the potentially many unique QR codes. System 103 may automatically generate the filename of weblink 205 and may allow the administrator to change the filename of the weblink. When the administrator finalises the change, system 103 verifies that the weblink is indeed unique by comparing it against all other existing weblinks. System 103 may generate a warning if the weblink is not unique and suggest a unique alternative.

It is noted that the hierarchical weblinks allow multiple weblinks with the same ending such as "HQ" as long as the path name is unique, such as "/company1/HQ" and "/company2/HQ" would be two unique weblinks.

User interface 200 further provides buttons 209 and 210 that allow the administrator to download the weblinks as .svg or .png files, respectively. Generating and downloading the image file is then considered 'deployment'. Other image formats are of course possible. Further, in the case of NFC tags, the actual tag may not be displayed as shown in FIG. 2 but a deployment button may prompt a NFC programmer to generate the corresponding NFC hardware tag. In one example, the unique weblink is 'frozen' at the time of deployment in the sense that it cannot be changed once the QR code has been downloaded in an image file or once the NFC chip has been programmed. This may then also be considered a 'static' QR code, keeping in mind that the information to which the code refers can be changed dynamically. This ensures that existing weblinks point to the correct end-point. If another weblink is required, a new QR code can be generated.

In this sense, the QR code becomes a hub of live information shared anonymously with any user who scans the QR code. In other words, the QR codes link to a hub of information that is live in the sense that it can be continuously updated by the administrator or automatically within seconds. For example, share prices, sensor data or sport results can be updated relatively frequently and those real-time pieces of information can be accessed by requesting the unique weblink. In this sense, the unique weblink refers to a website that is unique for this particular tag and can be configured specifically for this one tag.

This means it is possible to attach information behind QR code, which may be useful, for example, if there are a large number of retail outlets or other types of locations that belong to the same company, such as franchises or branches. In each branch, there may be one unique code that can be scanned by the locality manager to retrieve information specific for that particular branch. This means the manager does not need to input a locality ID or otherwise provide input to specify the required information. Instead, upon scanning the QR code, the information is delivered without any user input. This leads to a significant increase in convenience and allows more efficient access to information which may otherwise be buried within a large corporate tree.

Further, the access to information is configured around a deployment point which means information is provided to the right person, the right time, and the right information.

While the above examples describe the use of the unique read-only tag as a hub of information, the solution disclosed herein may provide the further functionality of initiating location-specific communication. For this purpose, configuration computer system 103 further stores the unique code in association with information regarding a communication end-point for communication in relation to the location.

Figure 3:
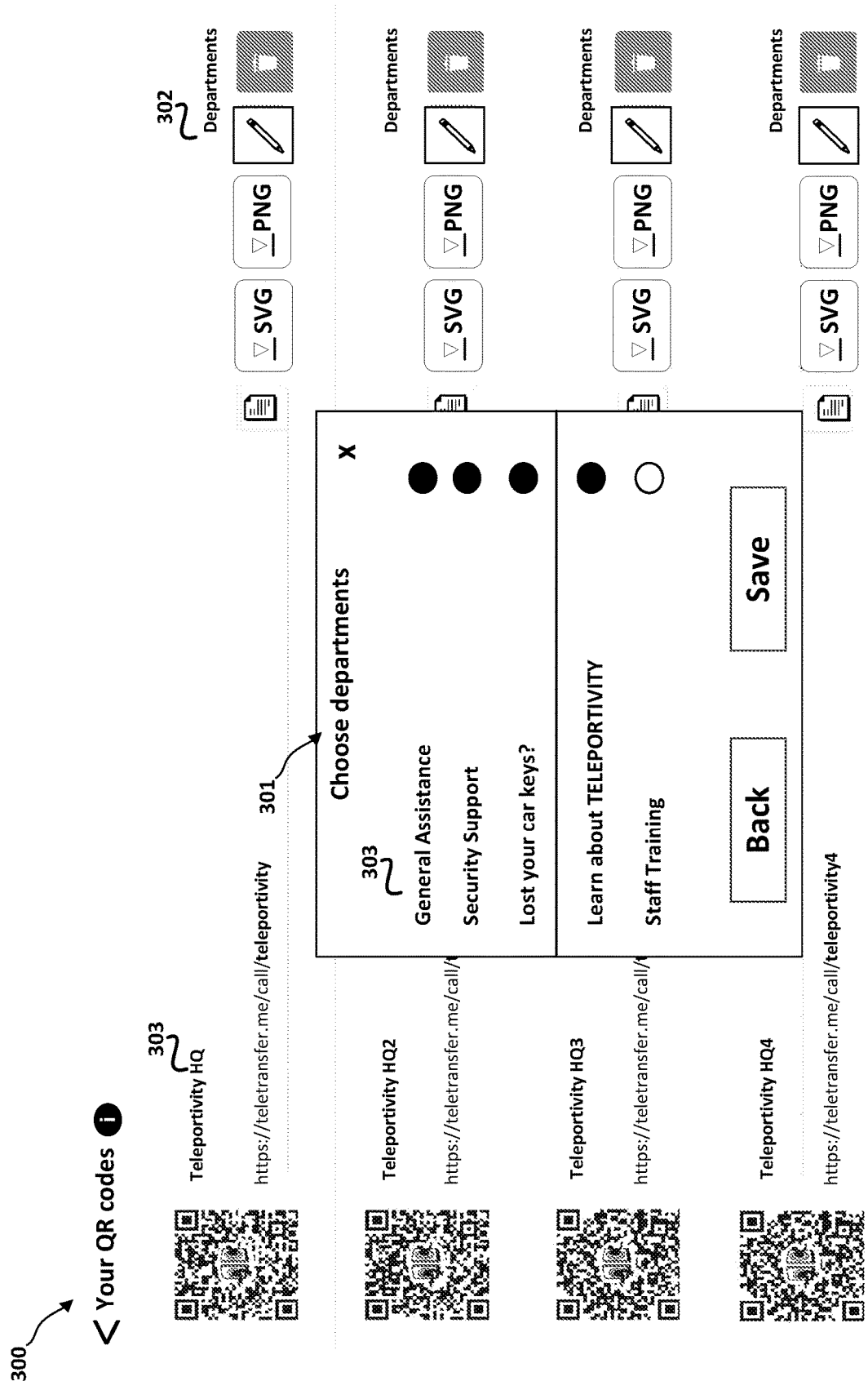
FIG. 3 illustrates a further user interface for configuring communication end-points.

FIG. 3 illustrates a further user interface 300 to configure the communication end-point. In particular, FIG. 3 shows a pop-up window 301 that was generated in response to the administrator clicking on a configure button 302 of the corresponding QR code 201. In this example, there are five pre-configured departments 303 and each of the departments 303 can be selected as a communication endpoint by clicking on the respective ticks. The communication end points may be represented as telephone numbers, video call accounts (such as Skype), PABX enpoints or other communication endpoints. At each endpoint there are one or more operators that may accept the communication. For example, if an entire department is configured as an endpoint, every available operator in that department receives a communication request and one of the operators can choose to accept it, similar to accepting a ringing phone call.

More particularly, communication server 104 is configured to receive a web-request for one of the unique weblinks from a personalised device that reads the read-only tag with the one of the unique weblinks encoded thereon. For example, the user may have a generic QR scanner app installed on a mobile phone. It is noted that many phones are already equipped with 'stock' QR scanners, which means download and installation of the app by the user is not required in those cases. For other phones, many users already have generic QR scanners downloaded and installed for other applications and these scanners are equally applicable here. There are a large number of QR scanners available that the user can choose from.

The generic QR scanner app uses the phone camera to capture and image and detect the QR code in the image. Using the black and white pattern, the app decodes the data encoded in the black and white pattern. The app is able to identify multiple types of predefined data types, such as vcf cards and weblinks. When the app identifies a weblink, such as one of the unique weblinks described above, the app automatically launches a web browser, such as Safari, Chrome, Mozilla or others, to access the website at that weblink decoded from the QR code. In other words, the personalised device generates a HTTP web-request for the one of the unique weblinks that was decoded from the tag, in the same way as the device would generate a web-request for any other ordinary website.

Communication server 104 receives the web-request and in response, retrieves the information regarding the location associated with the one of the unique weblinks from the data repository. Communication server 104 may then provide this information back to the personalised device in the form of a website. For example, communication server 104 may generate a mini-site that is optimised for mobile phones. This mini-site may include only a small amount of information in each of multiple pages. For example, there may be a sub-page for information about the unpersonalised device (type, serial number etc.) at the tag location and a second sub-page for a list of documents that are available for download (instruction manuals, etc.). There may be a further sub-page for multiple options to initiate a communication channel with an operator. However, this communication sub-page is not necessary and may not be present in all examples.

In one example, the mini-site is an instantiation of a site template, which is associated with this unique weblink. The page template may be associated with the weblink within user interface 200 by the administrator. The page template is a static frame work, including a static layout, for example, with background images, data fields at specified locations or lists of links. When communication server 103 receives the web-request and retries the information associated with that read-only tag, communication server 103 dynamically enters the retrieved information into the template to create the instance that is then provided to the personalised device in response to the web-request. There may be a library of page-templates that are grouped by company, by department or accessible globally to all administrators configuring the system. This allows the deployment of hundreds and thousands of unique codes with associated pages relatively quickly without the need to create each page manually.

In the examples where human communication (voice/video) between the user and an operator (service personnel) is desired, the communication server 103 provides the retrieved information to the operator at the communication end-point associated with the one of the unique weblinks. Further, communication server 103 establishes a communication channel between the personalised device and an operator.

For example, a call-centre operator may have installed a video communication program that allows offering incoming calls to the operator and allowing the operator to accept and perform calls through the personalised devices, such as through a HTML5 video communication link.

Importantly, the video communication program has a text field to display textual information to the operator. When the incoming call is offered to the operator, or once the operator accepts the call, communication server 103 displays the retrieved information associated with the unique weblink to the operator. This way, the operator knows instantly about the location. For example, the operator instantly knows the type of device and where the device is located. Accordingly, the operator can provide specific advice to that particular device.

Further, the operator may have available through the video communication program, further controls that can provide information back to the personalised device and therefore to the user. For example, the communication server 103 may provide to the operator a list of available documents, such as screen shots and instructions manuals, or step-by-step diagrams for particular user actions. Again, these are specific to the unique weblink and therefore specific to the device or location for which the user requires help or further information. The operator can select one or more of the specific pieces of information. In response, the communication server 103 sends the document or other piece of information to the device through the HTTP channel to the web browser of the personalised device. As a result, the user has the documents and the video call side-by-side for an optimal experience.

Figure 4:
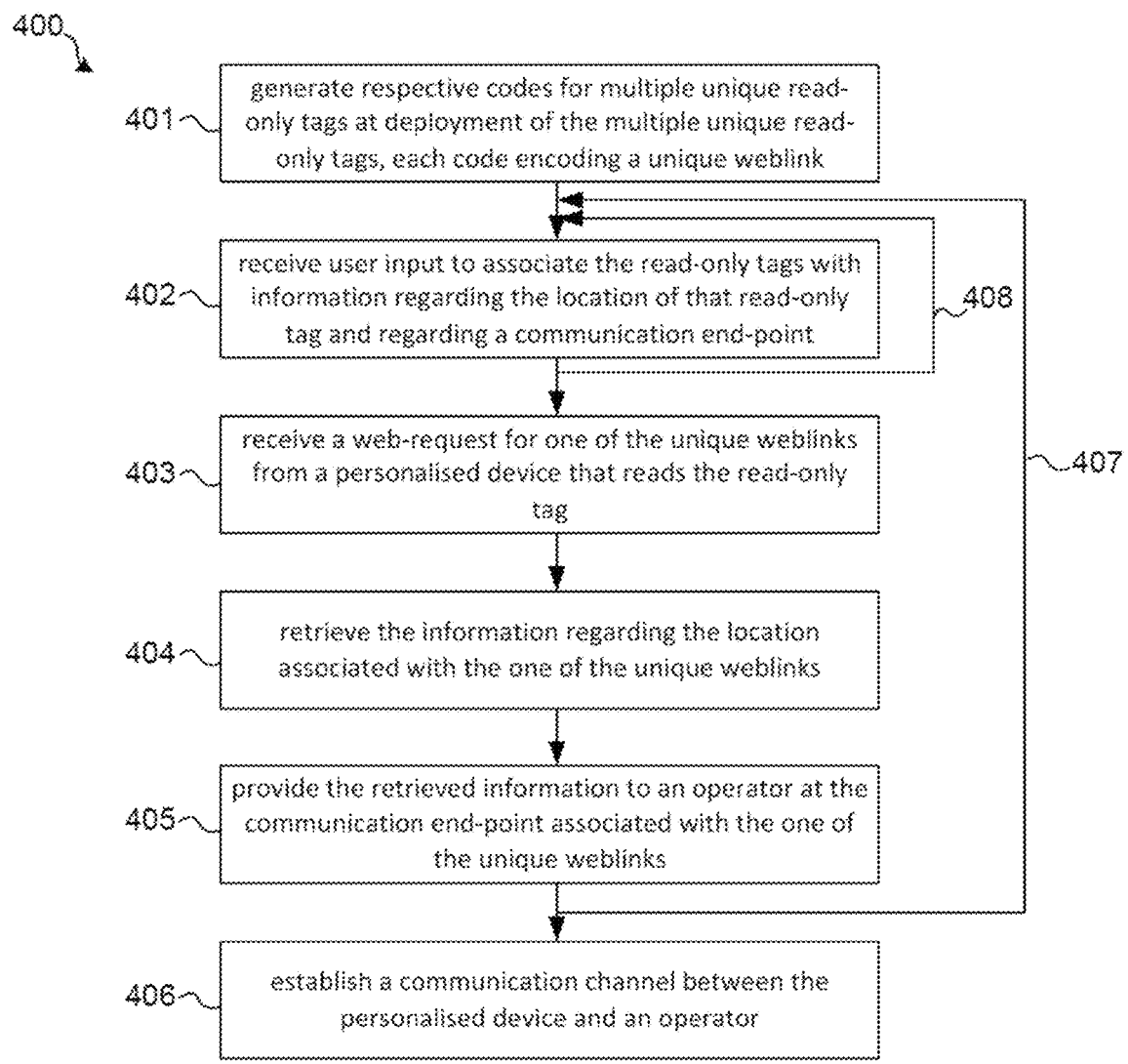
FIG. 4 illustrates a method for establishing a communication channel.

FIG. 4 illustrates a method for establishing a communication channel. The method commences by generating 401 respective codes for multiple unique read-only tags at deployment of the multiple unique read-only tags. Each code encodes a unique weblink as described with reference to FIG. 2. Then, the method proceeds by receiving 402 user input from an administrator to associate each of the multiple read-only tags with information regarding the location of that read-only tag and with information regarding a communication end-point for communication in relation to the location as described with reference to FIG. 3. The next step is receiving 403 a web-request for one of the unique weblinks from a personalised device that reads the read-only tag with the one of the unique weblinks encoded thereon. In response, the method retrieves 404 the information regarding the location associated with the one of the unique weblinks and provides 405 the retrieved information to an operator at the communication end-point associated with the one of the unique weblinks. Finally, the method establishes 406 a communication channel between the personalised device and an operator.

As described above, step 405 may comprise alternatively or in addition to the above, providing the retrieved information to the user of the personalised device so as to turn the QR code into an information hub. Further, as also set out above, the information associated with the code may be updated frequently after the request as indicated by arrow 407 or without receiving a request between updates as indicated by arrow 408. This way, the information associated with the tag/unique weblink is always up-to-date (i.e. 'fresh').

Figure 5:
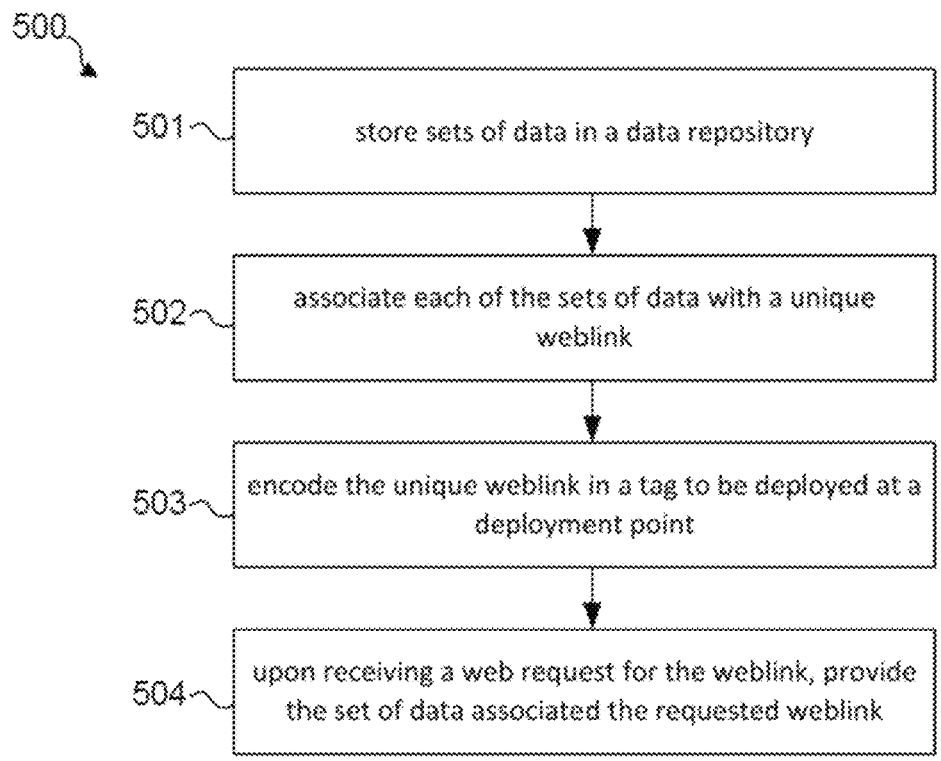
FIG. 5 illustrates a method 500 for information management.

FIG. 5 illustrates a method 500 for information management as performed by a computer system. Method 500 commences by storing 501 sets of data in a data repository as described above. This may be data for a particular location, such as a device location. The computer system then associates 502 each of the sets of data with a unique weblink, which are shown in FIG. 2. Associating sets of data with a weblink may comprise storing the data in a relational database by creating a record including a primary key of the code and a primary key of the sets of data. The computer system then encodes 503 the unique weblink in a tag to be deployed at a deployment point. Then, the computer system, upon receiving a web request for the weblink, provides 504 the set of data associated the requested weblink. The data repository is configured for repeated updating of the sets of data between requests for the weblink and while maintaining the association with the weblink. Again, this allows the use of the unique code as an information hub where any user who has access to the tag, can also access the information for this tag (location, device, etc.) without the need for any further user input.

Figure 6:
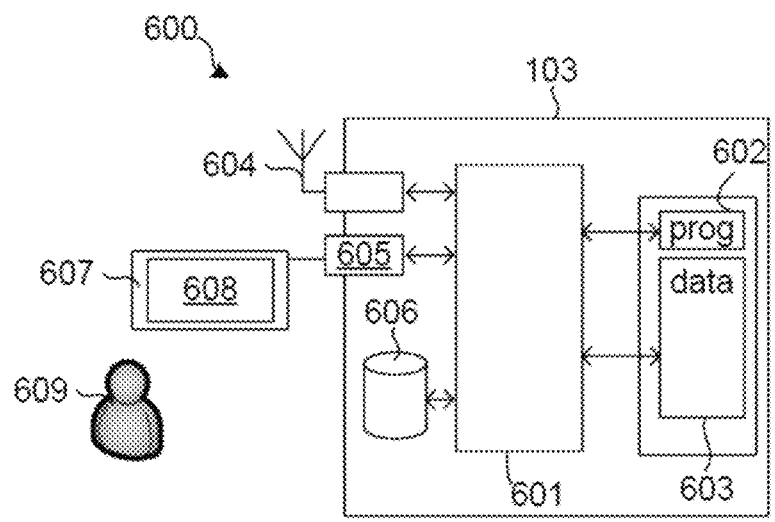
FIG. 6 illustrates a computer system for information management and/or establishing a communication channel.

FIG. 6 illustrates a computer system 600 for information management and/or establishing a communication channel. Computer system 600 comprises a processor 601 connected to a program memory 602, a data memory 603, a communication port 604 and a user port 605 as well as a data repository 606, such as a database, which may be relational or a graph database or other types. The program memory 602 is a non-transitory computer readable medium, such as a hard drive, a solid state disk or CD-ROM. Software, that is, an executable program stored on program memory 602 causes the processor 601 to perform the method in FIGS. 4 and 5, that is, processor 601 encodes a unique weblink into a read-only tag, receives a web-request for the unique weblink and returns information from the repository 606 associated with the weblink to the user or to an operator with whom processor 601 establishes a communication channel.

The processor 601 may then store the code on data store 603, such as on RAM or a processor register. Processor 601 may also send the determined code via communication port 604 to a server, such as billboard management server, QR print server or NFC configuration server.

The processor 601 may receive data, such as configuration data, from data memory 603 as well as from the communications port 604 and the user port 605, which is connected to a display 607 that shows a visual representation 608 of the current configuration and data associated with the weblinks to an administrator 609. In one example, the processor 601 receives configuration data from other users or servers, including internet of things (IoT devices) or webhooks, via communications port 604, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 601 receives and processes the configuration data in real time. This means that the processor 601 associates the configuration data with the weblink every time configuration data is received from other devices and completes this calculation before the other devices send the next configuration data update. For example, many sensors may be deployed in a remote sensing location and a unique QR code is attached to each sensor. Maintenance staff can then scan one of the QR codes to retrieve the latest sensor reading or historical sensor readings to check proper operation of the sensor without the need for matching sensor identifiers or connection wiring and port numbers.

Although communications port 604 and user port 605 are shown as distinct entities, it is to be understood that any kind of data port may be used to receive data, such as a network connection, a memory interface, a pin of the chip package of processor 601, or logical ports, such as IP sockets or parameters of functions stored on program memory 602 and executed by processor 601. These parameters may be stored on data memory 603 and may be handled by-value or by-reference, that is, as a pointer, in the source code.

The processor 601 may receive data through all these interfaces, which includes memory access of volatile memory, such as cache or RAM, or non-volatile memory, such as an optical disk drive, hard disk drive, storage server or cloud storage. The computer system 600 may further be implemented within a cloud computing environment, such as a managed group of interconnected servers hosting a dynamic number of virtual machines.

It is to be understood that any receiving step may be preceded by the processor 601 determining or computing the data that is later received. For example, the processor 601 determines data and stores the data in repository 606 in association with the weblink. The processor 601 then requests the data from the repository, such as by providing a read signal together with a memory address. The repository 606 provides the data as a voltage signal on a physical bit line and the processor 601 receives the data via a memory interface.

It is to be understood that throughout this disclosure unless stated otherwise, data, information, associations, nodes, edges, graphs, solutions, variables, and the like refer to data structures, which are physically stored on data memory 603 or repository 606 or processed by processor 601. Further, for the sake of brevity when reference is made to particular variable names, such as "period of time" or "request" this is to be understood to refer to values of variables stored as physical data in computer system 600.

It is further noted that FIGS. 4 and 5 are each to be understood as a blueprint for the software program and may be implemented step-by-step, such that each step in FIGS. 4 and 5 is represented by a function in a programming language, such as C++ or Java. The resulting source code is then compiled and stored as computer executable instructions on program memory 602.

It is noted that for most humans performing the methods 400 and 500 manually, that is, without the help of a computer, would be practically impossible. Therefore, the use of a computer is part of the substance of the invention and allows performing the necessary calculations that would otherwise not be possible due to the large amount of data and the large number of calculations that are involved.

Figure 7:
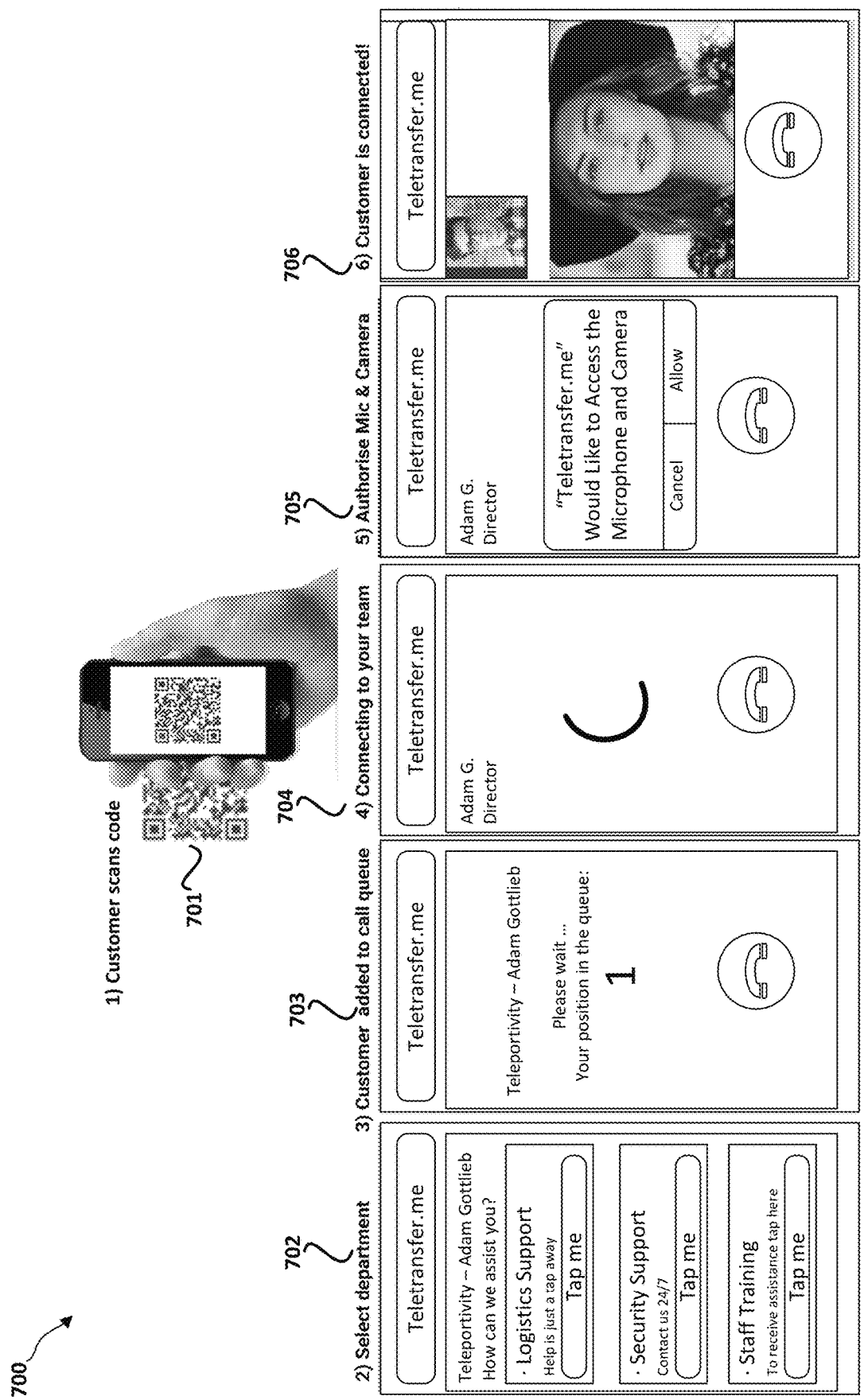
FIG. 7 illustrates an example sequence of screens displayed on a mobile phone.

FIG. 7 illustrates an example sequence of screens displayed on a mobile phone (the personalised device) to a customer. First, the customer scans 701 a QR code and the phone displays opens a browser to request the website at the weblink address encoded in the QR code. At that address, there is a selection screen 702 for selecting a department which is now displayed by the phone via the browser. In this example, the departments include logistics support, security support or staff training. Of course, this list may include individuals or other groups as well as automated end-points. Once the customer selects one of the departments, the customer is added to the queue which is indicated by e queue screen 703. When an operator is available, a communication channel is established which is indicated by connecting screen 704. For many phones, the customer will need to authorise the use of the phone's microphone and camera, which is requested on an authorisation screen 705. Finally, the customer is connected with a video communication channel 706. What is not shown in FIG. 7 is the information displayed to the operator at the other end of the communication.

It is again noted that there are three important functionalities of this system, which may be provided individually or in combination:
 a) Provide specific information to the person scanning the code;
 b) Provide specific information to an operator at a service centre (not scanning the code); and
 c) Establish a communication channel to an end-point (or selection of end-points) that is specific to the code.

The proposed system acts as an enhanced PABX video platform—ideal for teams. Since the entire user-side application can be implemented as a browser based application, no app is required to start video call. This is particularly useful for phones that have an in-built factory QR detector in the camera software during live view. There is also a centralised admin control of all endpoints. The system can be a cloud based system, which means all that is needed by administrators and operators is a web browser and camera/microphone. It is therefore possible to generate hundreds or thousands of QR Video unique endpoints providing a seamless connectivity into customer locations. This means, the operator knows where the customer is before they say a word. Further, there is provided remote control of all QR/Screen Endpoints with full control & visibility of the support team. Further, multiple team members can assist on-site clients seamlessly. The system is flexible so that staff can answer calls via PC or a mobile device when they are out in the field.

Figure 8:
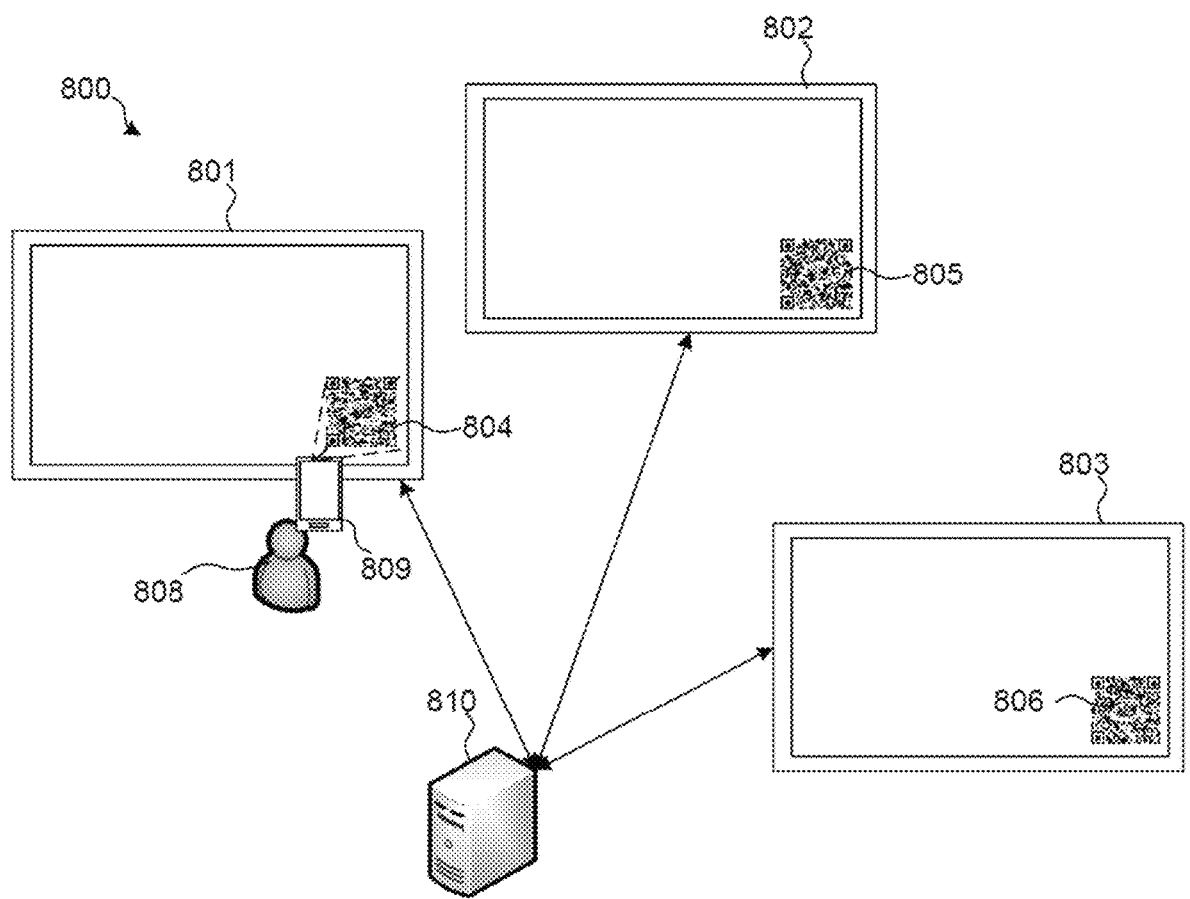
FIG. 8 illustrates a communication network.

FIG. 8 illustrates a communication network comprising three video screens 801, 802, 803, such as TV sets or computer monitors install across a venue, such as an exhibition centre or department store. Each screen 801, 802, 803 is associated with one unique QR code 804, 805, 806, respectively. In this example, the QR codes 804, 805, 806 are displayed on screen 801, 802, 803 but they may equally be printed and attached to the outside of the screens 801, 802, 803. Screens 801, 802, 803 also comprise front-facing cameras, microphones and speakers. A customer 808 operating a phone 809 visits the venue and requires help with directions or a particular product near the first screen 801. Therefore, customer 808 scans QR code 804, which prompts phone 809 to open a web browser and request a website for the weblink encoded in code 804 and stored on server 810. This alerts a support staff (who may be located remotely) of the customer. The support staff knows instantly where the customer is located and at which screen (801) the customer is looking due to the information associated with the QR code 804 and provided to the support staff by server 810. Therefore, the support staff can either manually activate screen 801 to start a video call or server 810 may automatically activate screen 801 or suggest screen 801 to the support staff to allow one-click activation. Again, the customer does not need perform any further action other than scanning the tag 804.

Figure 9:
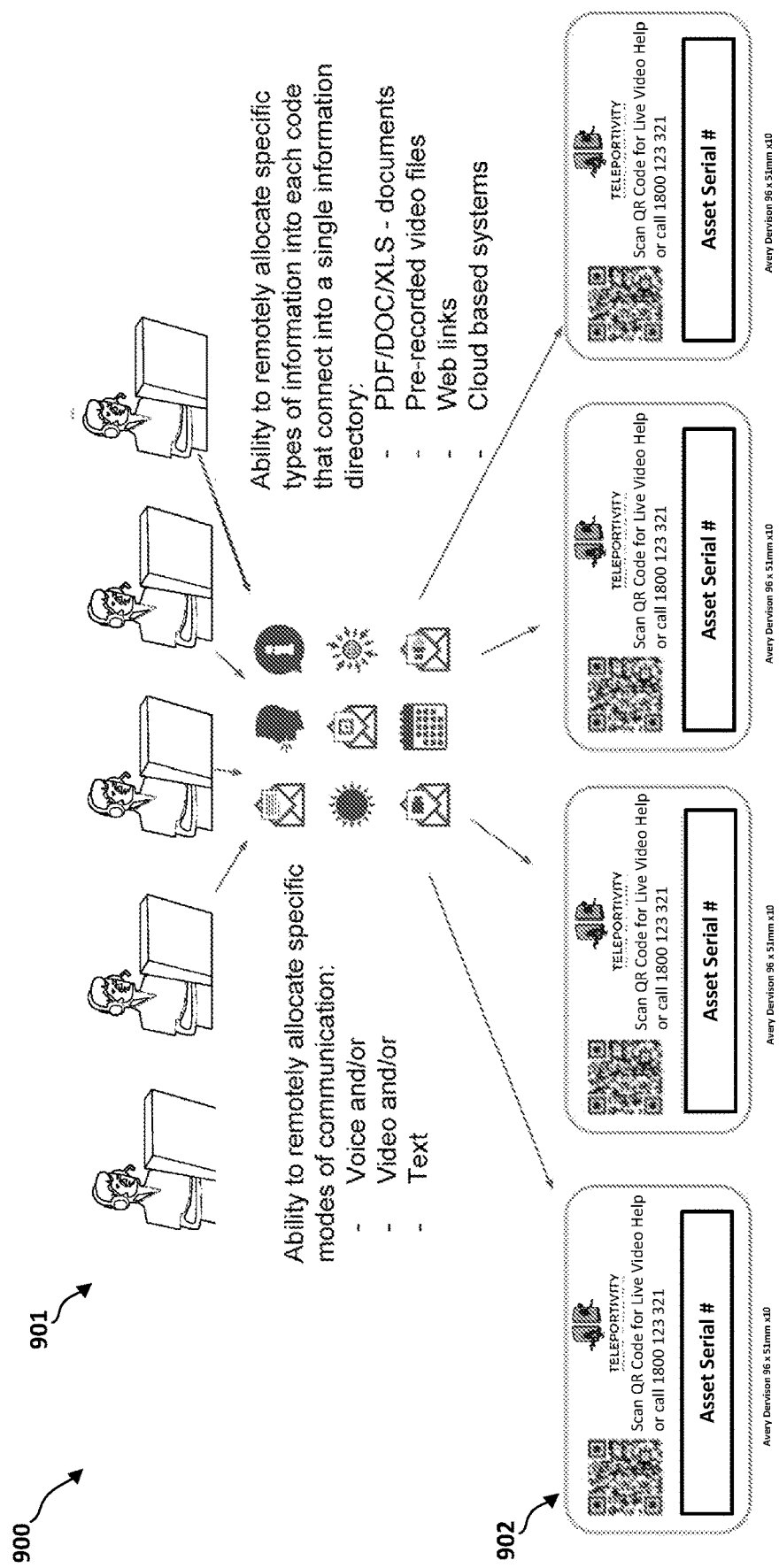
FIG. 9 illustrates another example communication network.

FIG. 9 illustrates another example communication network 900 comprising multiple operators 901 and multiple unique QR codes 902. With the disclosed system connecting the operators 901 to customers, the operators have the ability to remotely allocate specific modes of communication including Voice and/or Video and/or Text. Further, it is possible to remotely allocate specific types of information into each code that connect into a single information directory including:
 PDF/DOC/XLS—documents
 Pre-recorded video files
 Web links
 Cloud based systems As mentioned above, each code may include a weblink to a mini-site. However, multiple weblinks may point to the same mini-site and this mapping is dynamically configurable. This is another advantage of the solution disclosed herein that the mapping from the codes to the mini-sites can be configured at any time by the administrator and after deployment of the QR codes. For example, a large number of rooms have identical equipment and so at the first deployment, it appears reasonable to point all codes in these rooms to the same mini-site with the same information. However, as equipment gets gradually upgraded, it may be desirable to change some of the codes so that they point to their individual, unique mini-sites with specific information. With the disclosed system, it is readily possible for the administrator to change this mapping. This would not be possible if each code would link directly to a pdf document of user manual, for example.

Further, it is possible for an administrator to activate access controls for each mini-site. For example, the administrator may set a personal identification number (PIN) and only users who can enter the correct PIN can access the mini-site. This enables the implementation of use access control where only authorised users, who can provide valid authentication information, such as a valid PIN, can access the mini-sites. For example, in a campus environment, only university staff can access mini-sites while students are blocked from accessing those mini-sites. In this sense, server 600 provides the requested information upon receiving valid authentication information. So server 600 receives the entered PIN, checks that the entered PIN is valid and only when it is valid, provides the requested information, such as a mini-site.

Figure 10:
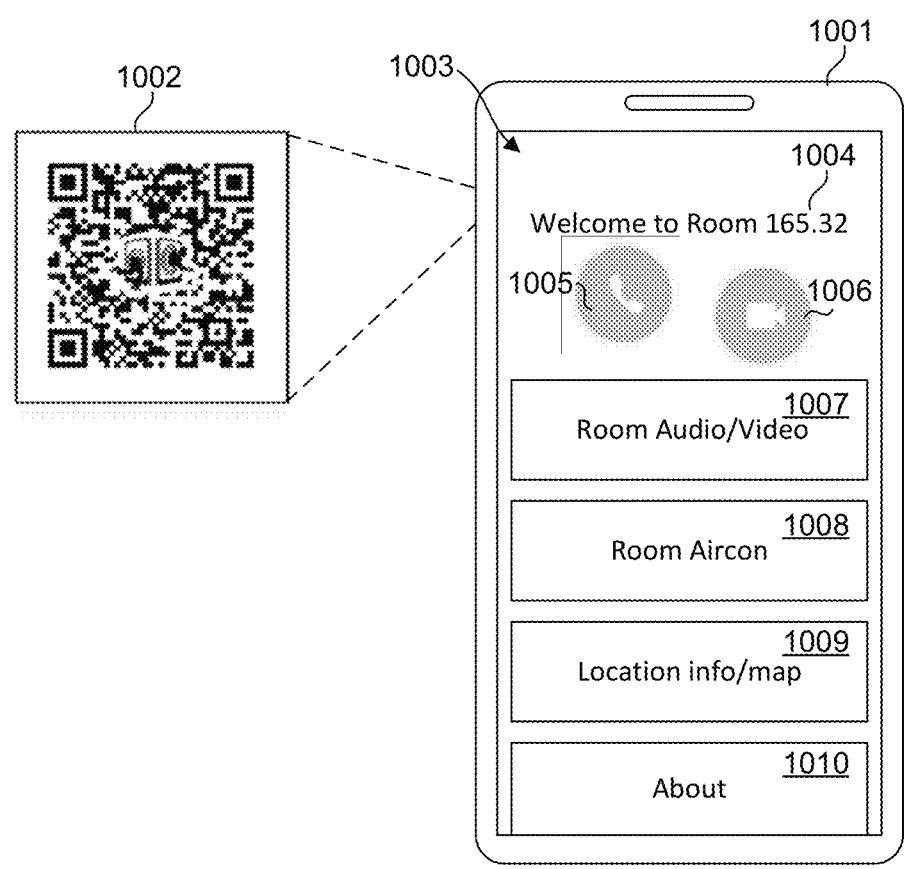
FIG. 10 illustrates the system above from a user perspective.

FIG. 10 illustrates the system described above from a user perspective, showing a mobile phone 1001 scanning a QR code 1002. As described above, QR code 1002 encodes a weblink and that weblink is unique for that location. In this example of FIG. 10, the location is a room within a building. In response to scanning QR code 1002, mobile phone 1001 directs the built-in browser application to a mini-site 1003 as indicated by the weblink. The mobile phone 1001 then displays the mini-site 1003 to the user. It is noted that a mini-site is a website that is adapted for a small amount of information so that it can be conveniently displayed on a small screen, such as a mobile phone screen.

Mini-site 1003 may comprise information that is specific to that location, such as a room number 1004. This is possible because the QR code 1002 is not used in other rooms but only deployed in this single location. Mini-site 1003 further comprises a voice call button 1005 and a video call button 1006. In response to the user tapping or activating one of these buttons, the mini-site establishes a voice call or video call, respectively. The communication end point is determined by the QR code as described above.

Mini-site 1003 further comprises a button for room audio/video 1007. Selecting this button prompts the browser application to display a further page including directions regarding the audio and video equipment that is installed in this particular room (i.e. location). There is also a button for room air conditioning 1008, which may display a site that has air conditioning controls in case the air conditioning system is integrated into the building IT system. Further buttons may include a button for location info and map 1009, which may display a map of the building with bathrooms, vending machines, cafes highlighted, and an about button 1010 that provides further information about the provided system and implementation version. Less buttons or further buttons may be included in addition to or as replacement of those shown in FIG. 10.

It is noted that the voice call button 1005 and video call button 1006 may be activated and de-activated through an administrator configuration interface. Further, the mini-site 1003 may be password protected, such that the mini-site 1003 is only displayed after entering the correct PIN. In other examples, the mini-site 1003 is partly displayed, so that some features are disabled, until the correct PIN is entered.

Figure 11:
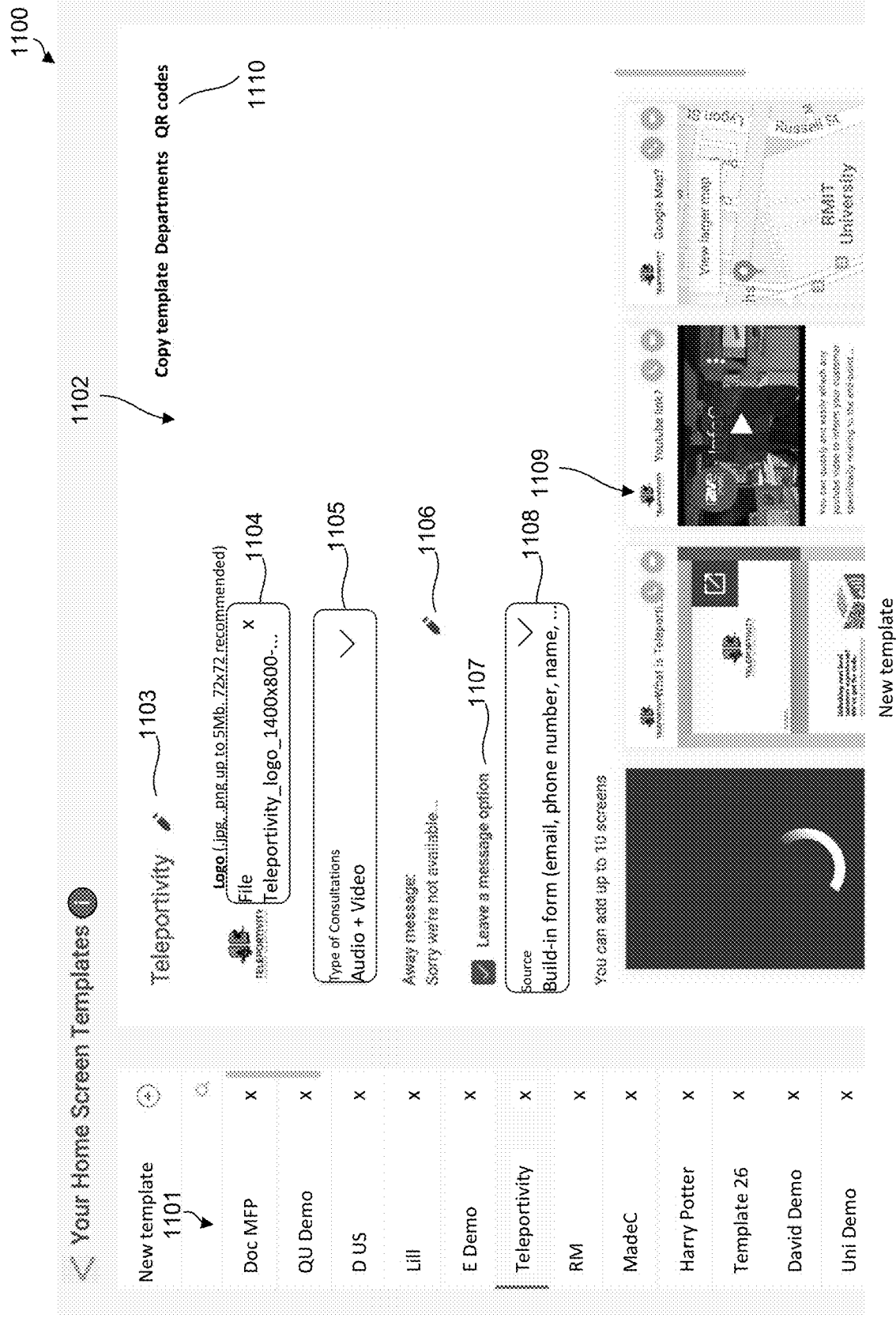
FIG. 11 illustrates an administrator interface.

FIG. 11 illustrates an administrator interface 1100 for configuring templates. There is a list of templates 1101 and in this case here, the administrator has selected the "Teleportivity" template, which opens a configuration panel 1102. The configuration panel 1002 enables configuration of a title 1103, logo 1104, type of consultations 1105, away message 1106, leave a message option 1107 and a source 1008 for leaving a message, such as an Built-in form including email, phone number and name fields.

The administrator can then add or remove screens from a variety of screens as shown at 1109. Each of the selected screens can be selected as described below. The administrator can also activate a QR codes button to 1110 to associate deployed QR codes with this template as will be described further below.

Figure 12:
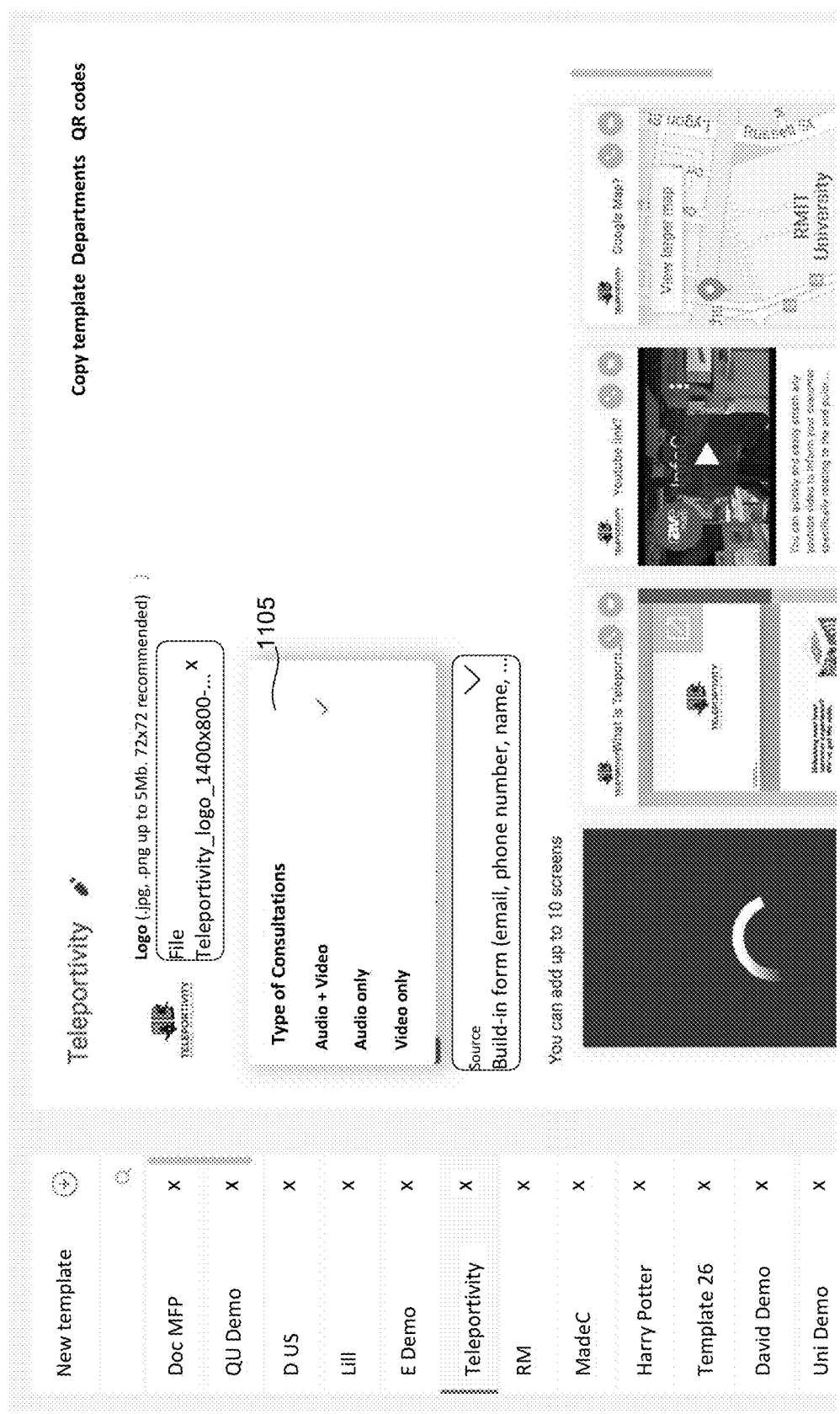
FIG. 12 shows the user interface from FIG. 11 but this time, the type of consultations menu is expanded.

FIG. 12 shows the user interface from FIG. 11 but this time, the type of consultations menu is expanded as caused by the administrator selecting the pull down menu 1105. The menu 1105 shows different options including Audio+Video, Audio only and Video only. By selecting one of these options, the administrator controls which of the voice call button 1105 and video call button 1006 in FIG. 10 are shown in the mini-site 1103.

Figure 13:
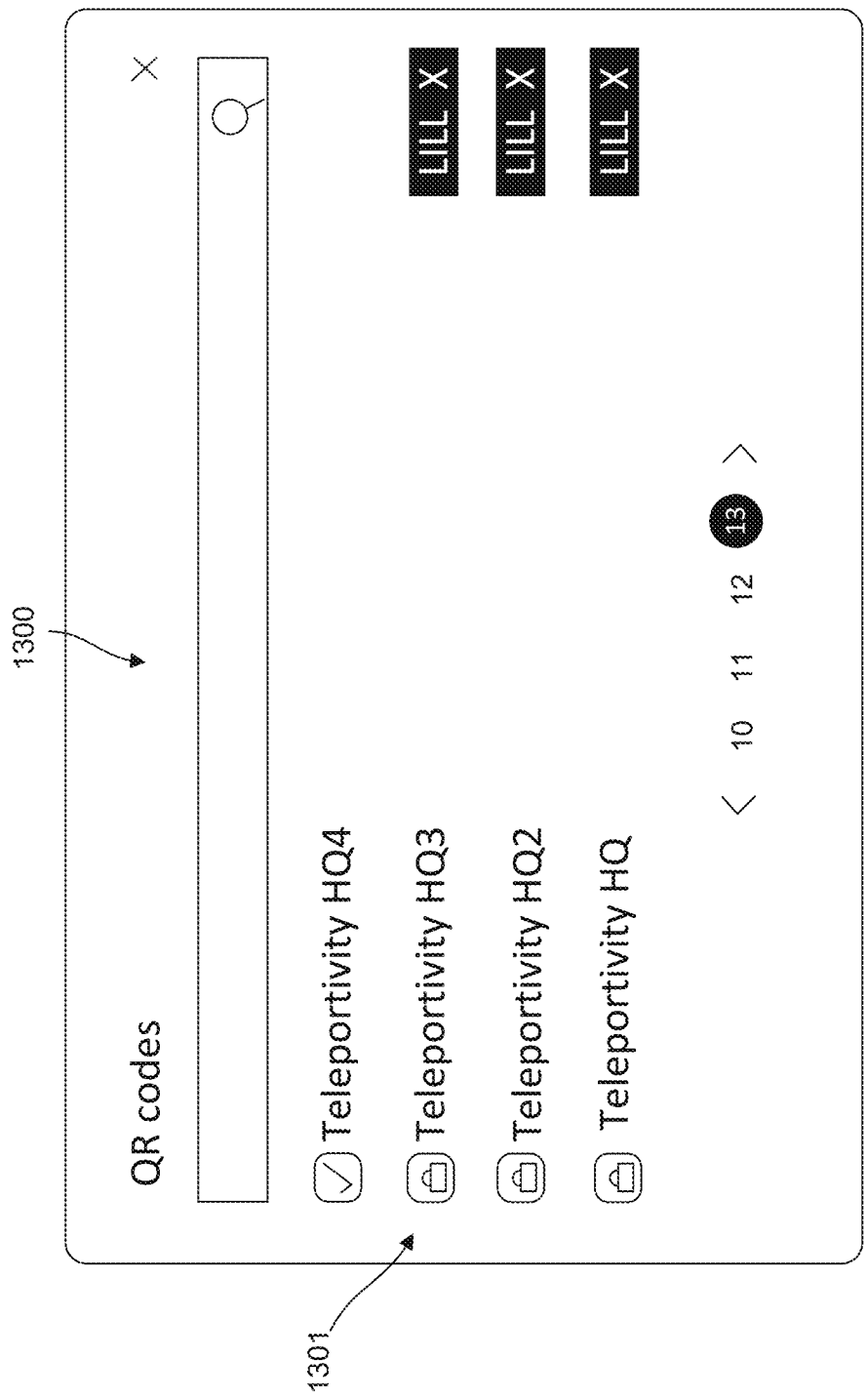
FIG. 13 illustrates a further user interface.

FIG. 13 illustrates a further user interface 1300 that is generated in response to the administrator selecting the QR codes button 1110 in FIG. 11 to associate QR codes to a template. User interface 1300 comprises a list of QR codes 1301 and the administrator can select each QR code in the list 1301. It is possible to select none, one or multiple QR codes. As described above with reference to FIG. 6, server 600 receives a web-request for a weblink and returns information associated with that weblink. User interface 1300 enables the administrator to configure this association, such that, when server 600 receives a web-request for one of the weblinks selected from list 1301, server 600 provides the current template to the browser application of the user.

Importantly, there is an advantage that the association between QR codes and templates is configurable while keeping the QR code in place unchanged. In other words, there is an intermediate routing layer between the QR code/weblink and the actual website that enables automatic re-routing of different weblinks to different sites (such as the mini-site in FIG. 10). Other internet technologies enable the redirection from one website to another, but this redirection cannot be implemented in different ways for the same weblink. For example, the same QR code may be deployed at multiple different locations and it is then not possible to route the web-requests to different sites because the weblinks are the same. Here, different locations have different QR codes with different weblinks encoded therein, and there is a configuration tool that enables the re-routing of weblinks to location-specific sites. However, multiple different QR codes may also be associated with the same template.

Figure 14:
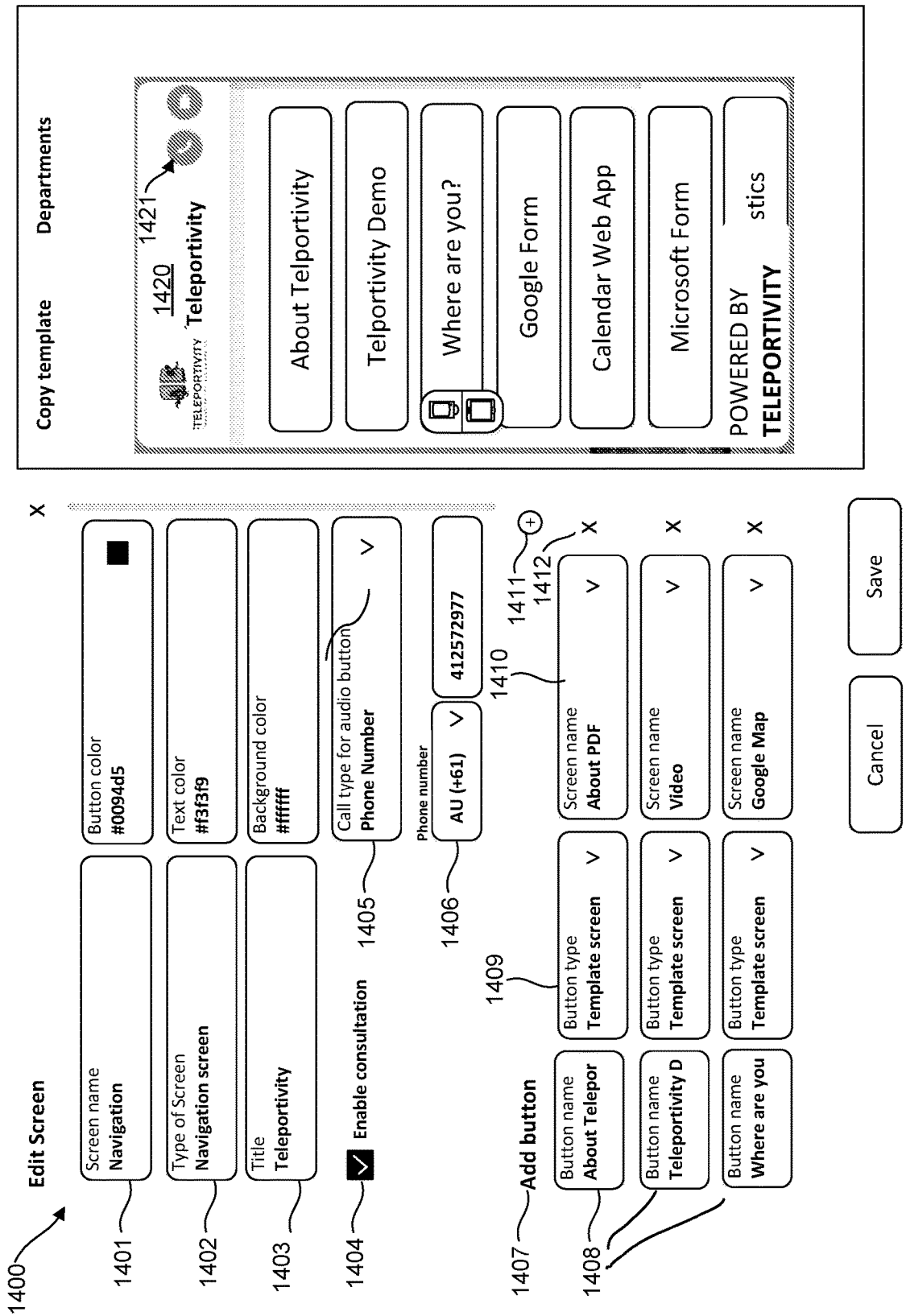
FIG. 14 illustrates an edit screen user interface.

FIG. 14 illustrates an edit screen user interface 1400, which enables an administrator to edit screens selectable from the template interface 1100 in FIG. 11. In this case, FIG. 14 is a navigation screen which map be the default "home" screen for the weblink. User interface 1400 has configurable fields for screen name 1401, type of screen 1402, title shown to the user 1403 and enabled consultation 1404. The administrator can also provide a call type 1405 and phone number 1406. In this example, the interface 1400 uses a plain old telephone system, but voice over IP (VoIP), such as Skype, Zoom, or other calls are also possible.

Further, the administrator can configure buttons 1407 that are displayed on this screen. Each button has a field for button name 1408, which is displayed to the user, a button type 1409, which specifies this button's behaviour and a screen name 1410. The screen name 1410 is a pull-down menu, which lists all available screens. and the administrator can select one screen for this button. This means that in response to the user activating this button, the selected screen 1410 will we be shown as the next page. There are also controls to add a new button 1411 and to remove a particular button 1412. The multiple 'screens' may also be referred to as 'pages' or 'sections. For example, the mini-site may provide an experience that is similar to a brochure where a user can move from page to page. However, each page can be its own unique experience. This means each page or screen under 1407 may be a web page, document, video, web app, or others.

While the buttons 1407 shown in FIG. 14 direct the browser to other screens of the template (i.e. internal links), it is also possible to add buttons to link to external sites. This may be configured by changing the button type 1409 to "External link", which then creates an input field for an external link. The other screens of the template may be loaded onto the mobile phone in response to the first web-request or on-demand when the user activates the corresponding button.

Adjacent to the configuration interface 1400 is a preview interface 1420 that shows the buttons added under 1407 as a user would see them in response to scanning the QR code associated with this template. Further, preview 1420 shows consultation buttons 1421. These are shown in the preview because they are activated through the enable consultation control 1404.

It is noted that each template may include macros that are executed by the server and that can include location-specific information into the template page when it is instantiated for a particular web-request. For example, each QR code may be associated with location information, such as a room number. This may be implemented as a database or table stored on server 600. When server 600 then receives a web request from a particular weblink encoded into a particular QR code, server 600 retrieves that location information and includes the location information into the template that is associated with that QR code. For example, the template may include a <room_no> macro that can be included to direct the server 600 to include the room number into the template. There may also be a drop-down list of all macros or all data fields so that the administrator can conveniently select one of the data fields for inclusion into the template.

Figure 15:
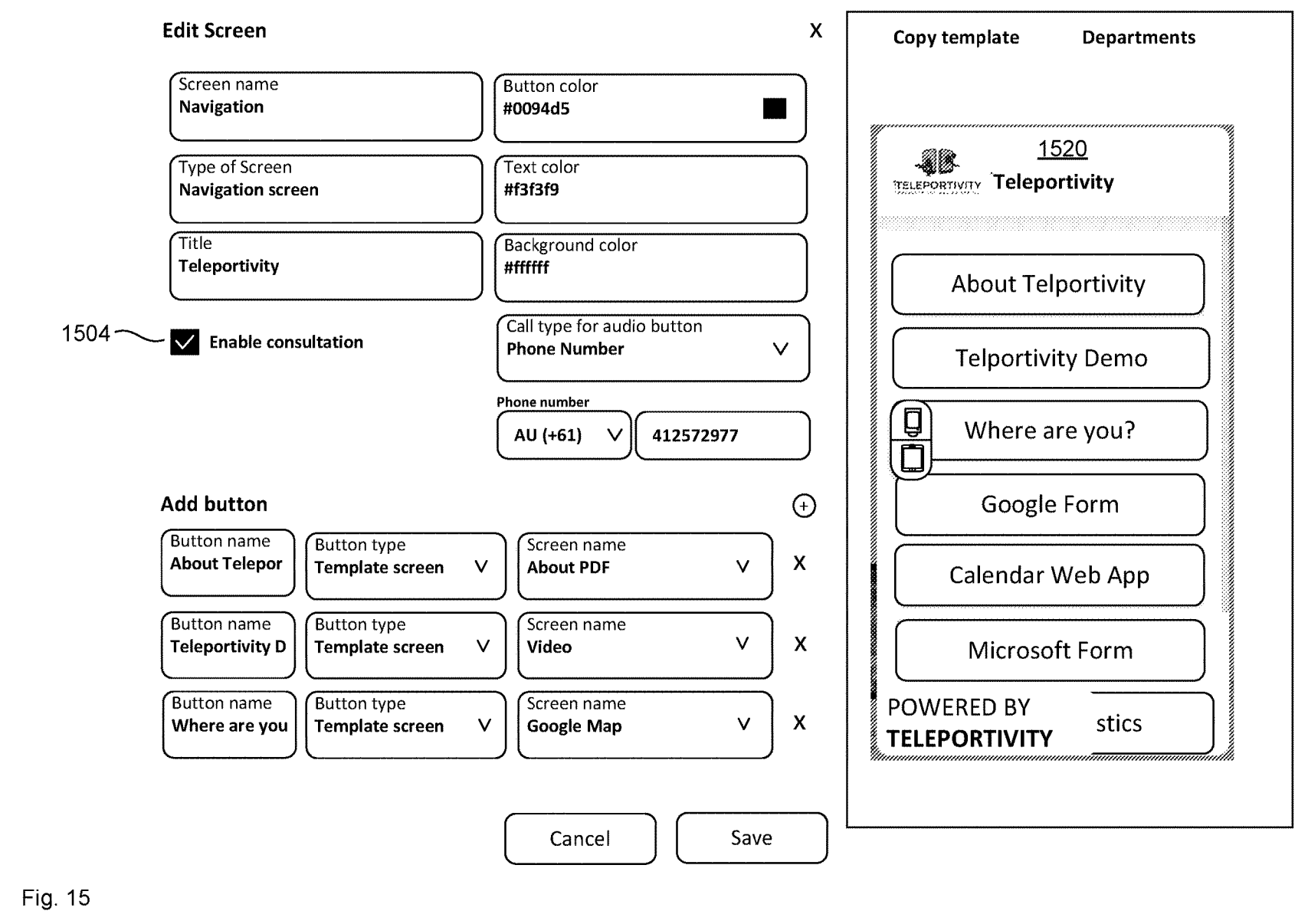

FIG. 15 illustrates the user interface of FIG. 14 but now the consultation is disabled at 1504, so the preview does not show the consultation buttons that were shown in FIG. 14 at 1421. Again, this is an advantage that the consultation buttons can be activated and de-activated dynamically and for each QR code individually. This would be difficult with static sites or solutions where the same QR code is deployed across multiple locations.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A telecommunication system comprising one or more processors configured to:
   receive a web-request for one of multiple unique weblinks from a personalised device that reads a read-only tag with the one of the unique weblinks encoded thereon;
   retrieve information regarding a communication end-point associated with the one of the multiple unique weblinks;
   generate a website and serve the website to the personalised device, the website comprising a call button, the call button being configured to initiate an audio or video call to the communication end-point associated with the one of the multiple unique weblinks; and
   in response to user input relating to the call button, establish a communication channel between the personalised device and an operator by routing the audio or video call to the communication end-point; and
   change, based on user input, the communication end-point of the call button in the website after deployment of the read-only tag.

2. The telecommunication system of claim 1, wherein the read-only tag comprises one or more of a printed QR code, a displayed QR code and an NFC device.

3. The telecommunication system of claim 1, wherein a location is associated with the read-only tag, the location being of a respective unpersonalised device and the information associated with the location comprises information about the unpersonalised devices to facilitate an operator to provide support for the respective unpersonalised devices.

4. The telecommunication system of claim 1, wherein the one or more processors are further configured to serve a website to the personalised device, the website comprising options for establishing the communication channel.

5. The telecommunication system of claim 4, wherein the website is based on a static template with dynamic elements that are filled with content specific to the read-only tag.

6. The telecommunication system of claim 4, wherein the options are based on the information associated with the location received from an administrator.

7. The telecommunication system of claim 4, wherein the options comprise multiple departments as end-points for the communication.

8. The telecommunication system of claim 1, wherein the weblink comprises a uniform resource locator (URL) comprising a hostname and a filename, wherein the filename is unique and generated by a deployment computer system to generate a code for the read-only tag.

9. The telecommunication system of claim 1, wherein the one or more processors are configured to generate a graphical user interface for an administrator to input information regarding a location of the read-only tag.

10. The telecommunication system of claim 9, wherein the graphical user interface comprises a list of candidate end-points from which the administrator can choose the end-point.

11. The telecommunication system of claim 1, further comprising a routing layer that routes the web-request to one of multiple websites, wherein the routing layer is configurable to change the one of the multiple websites after deployment of an associated unique read-only tag.

12. A method for establishing a communication channel, the method comprising:
- receiving a web-request for one of multiple unique weblinks from a personalised device that reads a read-only tag with the one of the unique weblinks encoded thereon;
- retrieving information regarding a communication end-point associated with the read-only tag read by the personalised device;
- generating a website and serve the website to the personalised device, the website comprising a call button, the call button being configured to initiate an audio or video call to the communication end-point associated with the one of the multiple unique weblinks; and
- in response to user input relating to the call button, establishing the communication channel between the personalised device and an operator by routing the audio or video call to the communication end-point; and
- changing, based on the further user input, the communication end-point of the call button in the website after deployment of the read-only tag.

13. A method for information management, the method comprising:
- storing sets of data in a central data repository, each of the sets of data comprising an indication of a communication end-point;
- associating each of the sets of data with a unique weblink;
- encoding the unique weblink in a tag to be deployed at a deployment point; and
- upon receiving a web request for the weblink, providing the set of data associated the requested weblink as a website that comprises a user control element to establish an audio call or a video call by routing the audio or video call to the communication end-point, wherein the central data repository is configured for repeated updating of the sets of data between requests for the weblink and while maintaining the association with the weblink.

14. The method of claim 13, wherein providing the set of data comprises sending the set of data in a response to the request for the weblink.

15. The method of claim 14, wherein associating each of the sets of data with a unique weblink results in an association between each of the sets of data with a unique weblink that is configurable to change the one of the sets of data that is associated with a the unique weblink after deployment of the tag at the deployment point.

16. The method of claim 13, wherein associating each of the sets of data with a unique weblink comprises associating one of the sets of data with multiple different unique weblinks.

17. The method of claim 13, wherein the method further comprises providing a configuration interface to activate and de-activate the user control element to establish the communication channel.

18. The method of claim 13, wherein the step of providing the set of data is performed upon receiving valid authentication information.

* * * * *